Oct. 18, 1932.  J. S. CLEELAND  1,883,574
SINKER
Filed Dec. 10, 1930
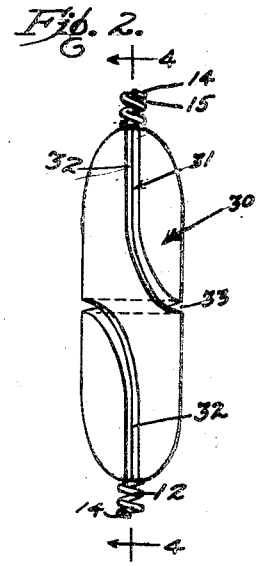
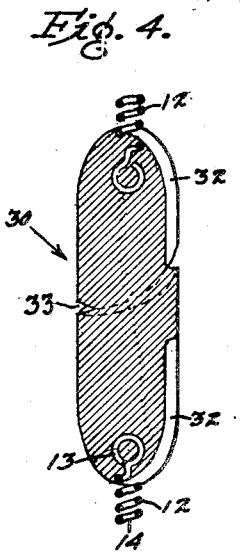
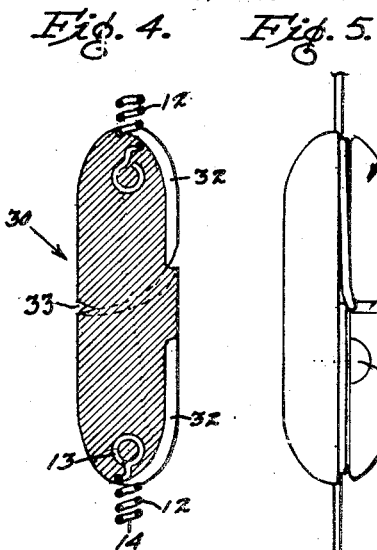
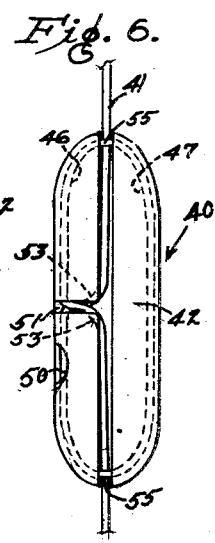
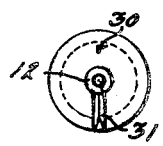
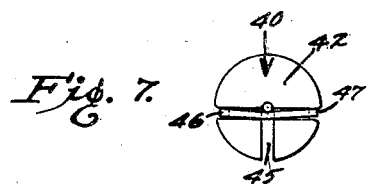
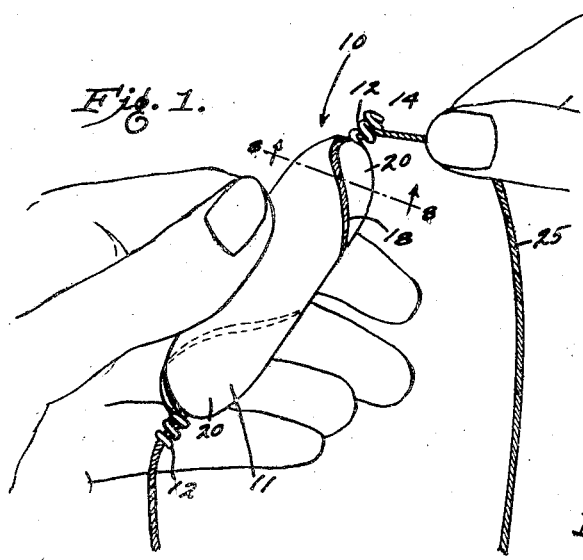
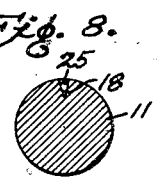
Inventor:
JOHN S. CLEELAND
By
Attorney.

Patented Oct. 18, 1932

1,883,574

UNITED STATES PATENT OFFICE

JOHN S. CLEELAND, OF GLENDALE, CALIFORNIA

SINKER

Application filed December 10, 1930. Serial No. 501,250.

My invention relates to fishing equipment and more particularly to fishing line sinkers.

In various types of fishing equipment, which include fish lines to which nets or hooks are attached for submerging the latter beneath the surface of the water, sinkers are provided for attaching to these lines. Certain of these sinkers are designed to be attached to the lines without parting the line. In most of these sinkers the line is either pinched or formed in some kind of a knot or hitch, which places an excessive local strain on the line at some particular point therein which tends to cause the line to break at that point.

It is accordingly an object of my invention to provide a sinker which may be readily attached to a line without parting the line so that the sinker may not be slid lengthwise on the line and in which no excessive local strains will be placed on the line tending to part this.

In sinkers previously devised to be inserted in a line some portion of the line lies against the surface of the sinker and extends outwardly beyond the most prominent portion of this surface so as to come in contact with the rocks and other objects on the bottom of the water in which the fishing is done. This subjects extending portions of the line to wear so that the line is weakened at these points and readily parts at times of unusual strain, as when a fish is caught.

It is another object of my invention to provide a sinker which is adapted to be inserted into a line without parting the line and in which those portions of the line engaging the sinker are all protected from becoming worn by contact with rocks or other objects over which the sinker may be dragged.

In certain of the sinkers previously devised for inserting into a line, the line is given a relatively large number of wraps about the sinker and then the material of the sinker is pinched against the line at opposite ends of the sinker to secure the line in place.

It is an object of my invention to provide a sinker adapted to be secured in a line without parting the line and in which the gripping of the line by the sinker is accomplished by a relatively small number of turns about the sinker and in which the line is retained in place on the sinker without pinching the ends thereof.

The manner of accomplishing the foregoing objects, as well as further objects and advantages, will be made manifest in the following description, together with the accompanying drawing, in which:

Fig. 1 is a perspective view of a preferred embodiment of my invention showing a fishing line partially applied thereto.

Fig. 2 is a front elevational view of a modified form of the sinker of my invention.

Fig. 3 is a plan view of Fig. 2.

Fig. 4 is a vertical sectional view taken on the line 4—4 of Fig. 2.

Fig. 5 is a front elevational view of another modified form of my invention.

Fig. 6 is a side elevational view of Fig. 5.

Fig. 7 is a plan view of Fig. 6.

Fig. 8 is a cross sectional view taken on the line 8—8 of Fig. 1.

Referring specifically to the drawing, the preferred embodiment of my invention as shown in Fig. 1 comprises a sinker 10 having a body 11 of approximately streamline form. Cast in the sinker body 11 and extending axially from opposite ends thereof, is a pair of coil springs 12. Each of the springs 12 has an anchor ring 13 formed on its inner end which is embedded in the material of the body 11, which material is preferably lead, babbitt, or some other heavy metal. An endmost turn 14 of each of the coils 12 is bent to approach relatively close to the turn adjacent thereto so as to provide a narrow line trapping space 15.

The exposed extremity of each coil 12 is rounded and polished for a purpose to be made clear hereinafter.

Formed in the outer surface of the body 11 is a groove or line channel 18 which extends in a helical path about the body 11, its opposite ends terminating at the springs 12. In the drawing, the body 11 is shown with its central part substantially cylindrical and its end portions rounded to provide shoulders 20. Fig. 8 is a cross section taken at one of these shoulders and shows the shape of the groove 18. The walls of this groove incline towards each other so that the bottom of the groove is relatively narrow.

The sinker 10 is adapted to be placed in a fish line 25 by a simple operation so that there will be no danger of the fish line becoming damaged owing to the sinker striking against rocks and other objects in the water. When thus placed in the line it is relatively impossible for the sinker to be removed therefrom accidentally, yet this may be readily effected if desired without damage to the line. In Fig. 1 the line 25 is shown partly applied to the sinker 10, the line being shown trained through the lower spring 12, lying in the channel 18 so as to follow this through its length, and in the process of being trained through the upper spring 12. The line 25 may be applied to the sinker 10 in any desired manner, the method shown being merely illustrative.

In one preferred manner of application, the body of the line is first laid in a middle portion of the groove 18, the sinker 10 being held in the left hand as shown in Fig. 1. The line 25 is then trained along the upper half of the groove 18 and wound clockwise about the spring 12. This causes the line 25 to pass between successive pairs of turns of the upper spring 12 until the line is forced through the restricted trapping space 15, thus completing the training of the line 25 through the upper spring 12. To complete the application of the line to the sinker 10, by this preferred method, the sinker is now taken in the right hand, and the line trained into the lower half of the groove 18. The lower spring 12 is now allowed to rest between the thumb and forefinger of the left hand, and with the right hand the sinker 10 is rotated so that the coils of the spring 12 screw themselves about the line 25 until this line passes axially through the lower spring 12 as shown in Fig. 1.

With the sinker 10 thus placed in the line 25 that portion of the line disposed in the groove 18 is entirely protected from contact with rocks or other rough objects disposed in the water in which the fishing line 25 is being used. The portion of the line adjacent the ends of the sinker 10 is protected by the springs 12 as these springs entirely surround the line. Movement of the sinker 10 lengthwise on the line 25 is prevented by the wedge shape of the groove 18 which causes the line to bind in this groove, particularly at the shoulders 20 of the body 11.

In Figs. 2, 3, and 4, I show a modified form 30 of the sinker of my invention, which is identical with the sinker 10 except as to the shape of the path followed by the groove in the body of the sinker. The sinker 30 has a groove 31 opposite end portions 32 of which are substantially in alignment and a middle portion 33 of which extends around the body of the sinker in a plane substantially at right angles to the axis of the sinker. One of the advantages of this construction is that the sinker 30 may be molded in a two-piece mold and can be removed from the mold merely by separation of the mold. The face of the sinker 30 presented to view in Fig. 2 is adapted to lie in one half of the mold, the opposite face in the other. The groove 31 has a wedge shaped cross section, as shown in Fig. 3, for the same purpose that the groove 18 of the sinker 10 is thus shaped.

Another modified form 40 of the sinker of my invention is shown in Figs. 5, 6 and 7. This sinker is also adapted to be placed in a line 41 without parting the same or tying any knots therein, but the sinker 40 has no special line trapping means at its opposite ends as have the sinkers 10 and 30.

The sinker 40 has a body 42 having a deep groove 45 which is disposed longitudinally and extends from the surface of the body 42 to the longitudinal axis thereof. Disposed preferably at an angle of 90 degrees or more with the groove 45 are grooves 46 and 47 which are relatively shallow and extend longitudinally along the surface of the body 42 so as to terminate at their opposite ends adjacent the axis of the body 42. Adjacent the groove 46 is a thumb nail notch 50 for a purpose which will be described later. Substantially medially of the body 42 is provided a deep transverse groove 51 of substantially the same depth as the groove 45, and which extends over practically a quarter of the cross sectional area of the body 42. Portions of the body 42 at the corners of the intersection between the grooves 45 and 51 are rounded as indicated at 53 for a purpose which will become clear hereinafter.

To apply the line 41 to the sinker 40 the line is first placed in the deep groove 45 and a loop thereof pulled through the groove 51 to the leftward. This loop is then reversed so as to lie over across the end portions of the line 41 and is depressed by the hand into the groove 47. Opposite ends of the line 41 are then pulled to bring the slack in the loop tautly into the opposite end portions of the groove 46. The result of this process is shown in Figs. 5, 6 and 7 in which the sinker is securely held in place on the line, the end portions of the line 41 being trapped against removal from the sinker by portions 55 of the line which cross the groove 45 in passing from the groove 46 to the groove 47.

It is thus seen that I have produced a sinker adapted to be secured into a line without parting the same which has many advantages over those previously devised for this purpose.

For instance, after my sinker has been attached into a line and the line is pulled, as when pulling the sinker through sand or seaweed, or over rocks and other obstacles, the friction applied to the line by the opposite converging faces of the wedge-shaped groove 18 is spread along that portion of the line lying in the groove so that no excessive local stresses are set up in the line tending to rupture the line.

Other advantages of my sinker result from the relatively deep spiral wedge-shaped groove by which the friction between the line and the sinker is secured. These advantages include a complete protection of the line from wear by shielding it from contact with objects against which the sinker is dragged in fishing, and the relatively high degree of friction obtained for a given length of groove by making the groove wedge-shaped and at the same time extending the groove over the convex surface of the sinker so that tightening on the line tends to draw the line downwardly and grip this between the opposite converging faces of the groove 18.

While I have shown certain specific preferred embodiments of my invention, it is to be understood that various changes and modifications might be made in these without departing from the spirit of the invention or the scope of the appended claims.

What I claim is:

1. In a fishing line sinker, the combination of: a substantially streamline body; and coils provided on said body and extending axially from opposite ends thereof, there bing a friction groove provided in said body terminating at the bases of said coils so as to communicate directly with the central channels of said coils.

2. In a fishing line sinker, the combination of: a substantially stream line body having a frictional groove therein forming an approximate spiral around said body, the pitch of a medial portion of said groove being considerably less than end portions thereof; and means for retaining said line on said body so as to lie in said groove and be frictionally held therein by engagement with the walls of said groove.

3. In a fishing line sinker the combination of: a body having a frictional groove extending substantially helically thereabout, the walls of a portion of said groove converging to a relatively narrow bottom, said portion extending over a convex surface on said body; and means for freely guiding portions of said line adjacent the ends of said body and positioning said line close to opposite ends of said groove, said means wedging said line downwardly between faces of said convex portion of said groove when said line is pulled outwardly from said means.

4. In a fishing line sinker to be inserted into a line without parting the line, the combination of: a substantially streamline body; and wire coils provided on said body at opposite ends thereof for releasably guiding said line in said coils, there being a wedge shaped groove formed in the outer surface of said body between said wire coils so that the bottom of said groove extends over a convex path, the portion of said line between said coils being urged into said wedge shaped groove by pulling on said line.

5. In a fishing line sinker the combination of: a body having a wedge shaped groove formed in the outer surface of said body so that the bottom of said groove extends over a convex path; and means on said body for freely guiding portions of said line adjacent opposite ends of said groove and causing said line when pulled relative to said sinker to be pinched between opposite side faces of said groove to substantially prevent longitudinal movement of said sinker on said line.

In testimony whereof, I have hereunto set my hand at Los Angeles, California, this 6th day of December, 1930.

JOHN S. CLEELAND.